United States Patent [19]
Kavanagh

[11] Patent Number: 5,853,033
[45] Date of Patent: Dec. 29, 1998

[54] WIRE UNTWISTING APPARATUS

[76] Inventor: Gregory S. Kavanagh, 693 Summit Ave., Brick, N.J. 08724

[21] Appl. No.: 892,804

[22] Filed: Jul. 15, 1997

Related U.S. Application Data

[63] Continuation-in-part of Ser. No. 683,598, Jul. 15, 1996, abandoned.

[51] Int. Cl.⁶ .................................................. B21F 21/00
[52] U.S. Cl. ......................................... 140/123; 57/1 UN
[58] Field of Search ............................. 29/461; 57/1 UN, 57/2.3, 2.5, 15, 361, 138; 140/111, 113, 118, 123, 149, 117

[56] References Cited

U.S. PATENT DOCUMENTS

| | | | |
|---|---|---|---|
| 450,671 | 4/1891 | Hoffmann | 140/118 |
| 1,181,297 | 5/1916 | Fenlason | 140/118 |
| 1,434,652 | 11/1922 | Emery | 140/117 |
| 2,260,443 | 10/1941 | Downing, Sr. | 57/361 |
| 3,380,486 | 4/1968 | Yonan | 140/149 |
| 3,420,280 | 1/1969 | Allyn | 140/149 |
| 3,578,035 | 5/1971 | Parker . | |
| 3,696,599 | 10/1972 | Palmer et al. | 57/156 |
| 3,779,290 | 12/1973 | Rich et al. | 140/149 |
| 4,188,840 | 2/1980 | Martschinke | 140/118 |
| 4,378,823 | 4/1983 | Normann et al. | 140/139 |

*Primary Examiner*—Lowell A. Larson
*Attorney, Agent, or Firm*—St. Onge Steward Johnston & Reens LLC

[57] ABSTRACT

The invention presented is a wire untwisting apparatus for untwisting a multi-wire cable. More specifically, the inventive wire untwisting apparatus includes a plate having a wire engaging face and wire securing face, the plate having at least four wire guides extending therethrough, and a shaft operably connected to the plate such that rotation of the shaft causes rotation of the plate.

9 Claims, 2 Drawing Sheets

5,853,033

WIRE UNTWISTING APPARATUS

RELATED APPLICATION

This application is a continuation-in-part of copending U.S. Ser. No. 08/683,598 filed Jul. 15, 1996, now abandoned, the disclosure of which is incorporated herein by reference.

FIELD OF THE INVENTION

The present invention relates to an apparatus for untwisting a wire. More particularly, the invention relates to a wire untwisting apparatus for untwisting assembled electrical cable.

Electrical cables, especially those for heavy duty applications, generally consist as a plurality of wires twisted together to form a single cable. Exemplary of such cables are those known as MC (metaloid), AC (aluminum clad), BX, Romax, as well as other types of twisted and/or stranded cable.

Conventionally, such cable is run in a building or other site where needed, to a box or other junction where the individual wires of the cable are connected, spliced or otherwise joined with other cable or an appropriate electrical connection or apparatus. Of course, in order to connect the individual cables with their respective connections, it is necessary to untwist the individual wires of the cable to free enough length of cable to provide the required connections. Heretofore, the untwisting of the wire has been done manually, a time-intensive and laborious process. For instance, it is not unusual to have so many cables coming into a location that the process of untwisting the various cables can take a full day or longer by worker(s).

What is desired, therefore, is an apparatus which can reduce the amount of time it takes to untwist the individual wires of a cable and thereby result in significant savings of time and effort.

BACKGROUND OR THE INVENTION

Nothing in the prior art appears to address a particular problem solved by the apparatus of the present invention. For instance, U.S. Pat. No. 3,578,035 to Parker discusses a tool which can be installed on a running length of wire and then adapted to be manipulated in order to twist the wire several times around itself leaving a "bight" or loop. This twister may then bend the running length of wire to extend substantially in an initial direction after which the tool can be reinstalled at a different position along the length of the wire and form a second loop, etc.

In U.S. Pat. No. 4,188,840 to Martschinke, a tool for untwisting the conductors of a twisted conductor cable is discussed. The tool comprises a rod of electrically insulating material having a tapered end and a channel bored into its tapered end, initially along the longitudinal axis of the rod. The channel angles away from the longitudinal axis to emerge at the surface of the rod, and is dimensioned to receive a conductor inserted into the channel at the tapered end of the rod. The tapered end facilitates the initial separation of the conductors and the tool is operated by rotation between thumb and forefinger until the desired length of conductor end segment is reached. Martschinke differs from the present invention in its ability to untwist only a single twisted pair of wires, rather than heavy-duty electrical cable having many wires twisted together.

In U.S. Pat. No. 3,420,280, Allyn describes a wire twisting device on which is mounted an elongated tube having a spirally-grooved spindle therein for effecting rotational movement of the tube and wire twisting device during axial movement of the spindle. The Allyn device, as is apparent, is limited to the twisting of wire and, in addition, can only function to twist a single wire.

In U.S. Pat. No. 450,671, Hoffmann describes a wire twisting tool. The Hoffmann tool consists of a handle having a stem extending therefrom. The stem has a knob at its end. Three strands of wire extend through various parts of the handle (one of which also extends along the length of the stem) and they meet and pass through the knob at the end of the stem. Twisting of the Hoffmann handle thereby twists the three strands of wire together at the "knob" end of the device, thus forming a triple stranded twisted wire.

In Downing, U.S. Pat. No. 2,260,443, a "wire rope nozzle" is disclosed. In this nozzle, a series of wires or rope strands pass through a wheel and into a spindle through which they pass and meet at the far end, where they are twisted into a multi-stranded cable or rope. It is readily apparent that the nozzle of Downing cannot be used as a wire untwisting apparatus, especially since much effort would have to be expended in manually untwisting the wire in order to provide enough length to feed free wire through the spindle and into the wheel. This would effectively defeat the purpose of a wire twisting apparatus since, in effect, much manual wire twisting would have to preceed the use of the apparatus.

Nothing in the prior art, therefore, provides an apparatus which is effective at the untwisting of multi-strand wire cables. Without such an apparatus, the installation of such cables remains a laborious enterprise.

DISCLOSURE OF THE INVENTION

It is an object of the present invention to provide an apparatus for untwisting multi-stranded wire cable.

It is a further object of the invention to provide an apparatus which is capable of untwisting wire cable having at least four wires, in a manner such that the untwisting of the wire cable can be accomplished with substantial savings of time and effort.

It is also an object of the present invention to provide a wire untwisting apparatus which can be utilized manually or with the assistance of a drill or other mechanical device, wherein the time and labor savings are observed whether the device is used manually or mechanically.

These and other objects, which will be apparent to the skilled artisan, can be accomplished with a wire untwisting apparatus which comprises a plate having a plurality of wire guides therein, and a rotation shaft extending from the plate such that rotation of the shaft causes rotation of the plate, wherein wires extending through the wire guides cause the cable from which they originate to untwist.

BRIEF DESCRIPTION OF THE DRAWINGS

These and other objects described in the present invention will be better understood and its advantages more apparent in view of the following detailed description, especially when read with reference to the appended drawings wherein.

BEST MODE FOR CARRYING OUT THE INVENTION

Figure 1:
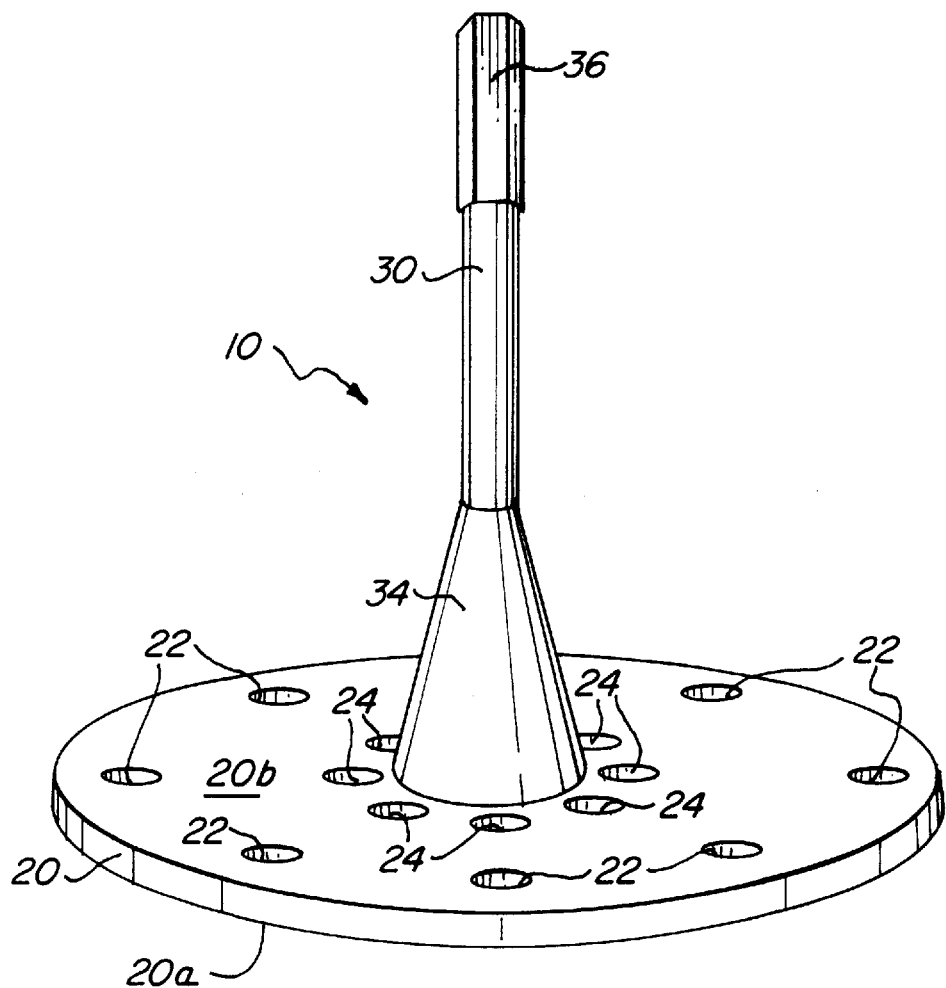
FIG. 1 is a side perspective view of a wire-twisting apparatus in accordance with the present invention.

As used herein, the terms "top", "bottom", "front", "rear", etc. refer to the wire untwisting apparatus of the present invention in the orientation shown in FIG. 1. It will be appreciated, however, that the apparatus will assume any of various orientations when in use. It will also be recognized that although the apparatus is described in terms of the untwisting of multi-wire electrical cable, it can also be used to untwist various other multi-strand objects, including rope. In addition, it is also possible to use the inventive apparatus to twist multi-strand objects such as electrical cable or rope.

Referring now to FIG. 1, a wire untwisting 10 is shown which comprises a plate 20 and a rotation shaft 30 extending from plate 20.

Plate 14 can assume any appropriate shape, including round, oval, square, triangular or polygonal. Preferably, plate 20 is round, although there does not appear to be a significant functional disadvantage in the use of other shapes for plate 20. Plate 20 can be formed of any suitable material having the required dimensional stability for its purpose, including plastic (especially high density plastic) or plastic composites, metals, epoxy, fiberglass, rubber, wood, ceramic or other materials having the required strength and stability.

Figure 2:
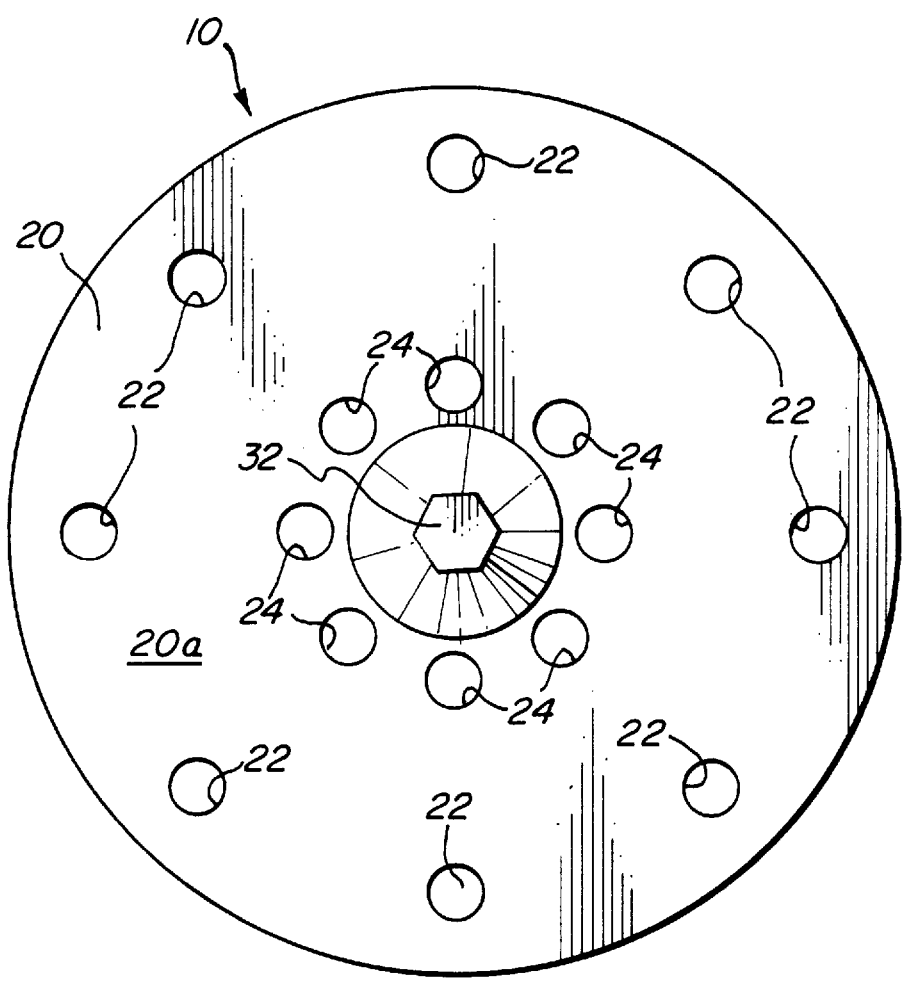
FIG. 2 is a side plan view of the wire-twisting apparatus of FIG. 1.

As seen in FIGS. 1 and 2, plate 20 comprises two faces, a front or wire receiving face 20a and a rear or wire engaging face 20b.

Plate 14 also comprises at least three wire guides 22, which extend through plate 20 from wire receiving face 20a to wire engaging face 20b. There are at least as many wire guides through plate 20 as there are strands of wire of the cable to be untwisted by apparatus 10. In other words, if the cable to be untwisted comprises 16 strands of wire, there should be at least 16 wire guides 22 through plate 20. Generally, there are between 4 and 35 wire guides through plate 20 since most cables to be untwisted comprise between 4 and 35 wires. More preferably, there are 10 to 22, and most preferably, 12 to 20 wire guides 22 through plate 20.

In an advantageous aspect of the invention, plate 20 also comprises a structure for maintaining in place the ends of strands of wire which extend through wire guides 22. For instance, clips suitable for holding wire ends or spindles about which wire ends can be wrapped can be disposed on wire engaging face 20b of plate 20 to thereby engage the ends of wires extending through wire guides 22. In this way, the wires are prevented from slipping back out of wire guides 22 while wire untwisting apparatus 10 is in use. Most advantageously, plate 20 comprises wire engaging ports 24 through which the ends of wires extending through wire guides 22 can be placed. In other words, wire strands which extend through wire guides 22 from wire engaging face 20a of plate 20 to wire engaging face 20b of plate 20 can then be passed through wire engaging ports 24 back towards wire engaging face 20a of plate 20. In this way, wire strands extending through wire guides 22 are maintained in place and are prevented from sliding out of wire guides 22. Preferably, there are at least as many wire engaging ports 24 in plate 20 as there are wire guides 22, or at least as many as there are wires in the cable to be untwisted.

Wire untwisting apparatus 10 also comprises rotating shaft 30, operably connected to plate 20. Shaft 30 is mated with plate 20 in any suitable manner such that rotation of shaft 30 causes rotation of plate 20. For instance, shaft 30 can be constructed such that it has a hexagonal shape head 32, which can mate with a hexagonal shape opening in plate 20. Thus, plate 20 is caused to rotate when shaft 30 rotates. Other means of operably mating shaft 30 and plate 20 such that plate 20 rotates when shaft 30 is rotated would be within knowledge of the skilled artisan.

In a preferred embodiment of the invention, shaft 12 also comprises a shaft bottom 34 which is conically shaped to provide structural integrity and strength to shaft 30, especially when mechanically rotated as discussed hereinbelow.

Shaft 12 can also comprise a shaft top 36 which is shaped so as to permit shaft 30 to mate with a drill or other apparatus to facilitate the mechanical rotation of shaft 30, and thereby plate 20. Contrariwise, shaft top 36 can comprise a handle or other comfort grip for the manual rotation of shaft 30. Shaft 30 can be constructed as one unit comprising shaft 30 as well as shaft top 36 and shaft bottom 34, or the individual parts of shaft 30 can be constructed separately and combined for operation, as would be familiar to the skilled artisan.

In use, a multi-wire cable, such as one containing from about 12 to about 20 wires, to be untwisted is partially untwisted so as to provide enough individual wire stands to extend each individual wire strand through one of wire guides 22. These individual wire strands are then preferably secured in plate 20 through the use, for instance, of wire securing ports 24. Once the individual strands of wire are secured, wire untwisting apparatus is rotated, through rotation of shaft 30, either mechanically or manually, to thereby untwist the length of wire cable, the individual wires of which are secured to plate 20.

In this manner, untwisting of lengths of multi-wire electrical cable can be accomplished in a significantly reduced time as compared to the currently performed manual untwisting of the wire strands.

While a preferred embodiment of the present invention has been described above and illustrated in the accompanying drawings, it is understood that other embodiments are within the contemplation of the inventor and within the scope of the claims, and the invention is not limited to the specific embodiments shown.

What is claimed is:

1. A wire untwisting apparatus for untwisting a multi-wire cable, comprising:
    a plate having a wire engaging face and a wire securing face, the plate having at least four wire guides extending therethrough, at least four wire securing ports extending through the plate; and
    a shaft operably connected to the plate such that rotation of the shaft causes rotation of the plate.

2. The wire untwisting apparatus of claim 1, wherein there are at least as many wire guides as there are wires in the multi-wire cable.

3. The wire untwisting apparatus of claim 2, wherein there are at least as many wire securing ports as wire guides.

4. The wire untwisting apparatus of claim 1, wherein the shaft comprises a handle to facilitate the mechanical rotation of the shaft.

5. A method for untwisting a multi-wire cable, comprising:
    a) providing a plate having a wire engaging face and a wire securing face, the plate having at least four wire guides extending therethrough, and a structure associated with the plate for preventing the wires from feeding back out of the wire guides;

b) feeding each wire of the multi-wire cable through one of the wire guides; and c) rotating the plate to thereby untwist the multi-wire cable.

6. The method of claim 5, which further comprises providing a shaft operably connected to the plate such that rotation of the shaft causes rotation of the plate.

7. The method of claim 6, wherein rotation of the plate is accomplished by rotation of the shaft.

8. The method of claim 5, wherein there are at least as many wire guides as there are wires in the multi-wire cable.

9. The method of claim 5, wherein the structure comprises wire securing ports to which extend through the plate.

* * * * *

UNITED STATES PATENT AND TRADEMARK OFFICE
CERTIFICATE OF CORRECTION

PATENT NO. : 5,853,033
DATED : December 29, 1998
INVENTOR(S) : Gregory S. Kavanagh

It is certified that error appears in the above-identified patent and that said Letters Patent is hereby corrected as shown below:

At Column 1, line 39 "OR" should be replaced with --OF--.

Signed and Sealed this

Fourth Day of May, 1999

*Attest:*

*Attesting Officer*

Q. TODD DICKINSON

*Acting Commissioner of Patents and Trademarks*